United States Patent

[11] 3,632,249

[72] Inventor William S. Pearson
 Hampstead, Md.
[21] Appl. No. 838,074
[22] Filed July 1, 1969
[45] Patented Jan. 4, 1972
[73] Assignee Cypro Incorporated
 Hampstead, Md.

[54] APPARATUS FOR MOLDING HOLLOW PLASTIC ARTICLES
 30 Claims, 11 Drawing Figs.
[52] U.S. Cl. ................................................. 425/151,
 425/324, 425/342, 425/451, 264/97
[51] Int. Cl. ..................................................... B29d 23/03,
 B29f 1/06, B29c 1/06
[50] Field of Search ........................................ 18/5 BB, 5
 BC, 5 BF, 5 BH, 5 BJ, 5 BN, 5 BP, 5 RR, 20 B, 20
 H, 20 R, 20 RR; 264/97

[56] References Cited
 UNITED STATES PATENTS
 2,515,093 7/1950 Mills ............................. 18/5 BN
 2,579,399 12/1951 Ruehberg ..................... 18/5 BP
 2,750,624 6/1956 Coates et al. .................. 18/5 BN X
 3,305,891 2/1967 Nozaki .......................... 18/5 BP
 3,310,834 3/1967 Simpson et al. ............... 18/5 BP
 3,402,431 9/1968 Fogelberg et al. ............ 18/5 BB X

*Primary Examiner*—Robert L. Spicer, Jr.
*Attorney*—Hill, Sherman, Meroni, Gross & Simpson

ABSTRACT: Apparatus for molding hollow plastic articles such as bottles comprises a rotor driven in one direction, with a plurality of separable mold assemblies with complementary cavitated mold halves articulated for opening and closing and mounted in circumferential alignment on the rotor, adapted while travelling a circular path therewith to register seriatim with a plastics extruder. Motivating means operable cyclically in the rotation of the rotor open each of the mold assemblies sequentially before reaching the extruder to release molded articles and while still open and upon registering with the extruder to receive plastic material therefrom, the motivating means then acting to close the mold assemblies for molding the thus received plastic material. The mold assemblies are substantially permanently mounted on the rotor and have replaceable cavity inserts facilitating changeovers.

A method of molding blown hollow plastic articles in a continuous string with ribbed integral connecting links.

Fig.1

INVENTOR.

William S. Pearson 3,632,249

APPARATUS FOR MOLDING HOLLOW PLASTIC ARTICLES

This invention relates to apparatus for molding hollow plastic articles, and is more particularly adapted for relatively high-speed blow molding of plastic bottles, and the like.

Hollow plastic articles have generally been produced in single of multicavity molds by injection of thermoplastic material or by extrusion into the molds in a step and advance manner. Such prior expedients have been slow and cumbersome and the coat of individual molded articles has necessarily reflected the limitations upon productivity.

Another disadvantage in prior apparatus has been that the molds which are generally water cooled have required unduly long shutdown of production machines when articles of different size or configuration are to be made on the same machine, requiring laborious uncoupling and recoupling of water ducts, and the like.

The foregoing and other disadvantages, deficiencies and shortcomings of prior apparatus are overcome in a highly efficient and advantageous manner and with marked economy and greatly increased productivity by the present invention which provides apparatus adapted to operate at high speed to produce articles continuously and which when it is desired to change or replace any one or all of the molds minimum downtime or stoppage of production is necessary and far less than as heretofore been customary.

It is, accordingly, an important object of the present invention to provide new and improved article molding apparatus of superior efficiency, increased reliability, greatly improved operating performance and producing capacity, ease and simplicity of adjustment for production accuracy, and significantly increased speed of production.

Another object of the invention is to provide a new and improved plastic article molding machine which is adapted for high-speed continuous blow molding of plastic articles connected together in articulated series for convenience in stripping from the molds of the machine operating seriatim.

A further object of the invention is to provide new and improved plastic article molding apparatus having a novel arrangement of separable molds mounted on a rotor for seriatim registration with a plastics extruder.

Still another object of the invention is to provide new and improved means in rotary plastic article molding apparatus for operating a series of separable molds for high-speed, high-production operation.

Yet another object of the invention is to provide new and improved plastic article molding apparatus with novel means for effecting quick change in the molding dies whereby to greatly minimize downtime for the apparatus.

A still further object of the invention is to provide a new and improved method of molding plastic articles in a continuous separable string.

Other objects, features and advantages of he invention will be readily apparent from the following description of the certain preferred embodiments thereof, taken in conjunction with the accompanying drawings, although variations and modifications may be effected without departing from the spirit and scope of the novel concepts of the disclosure, and in which:

Figure 1:
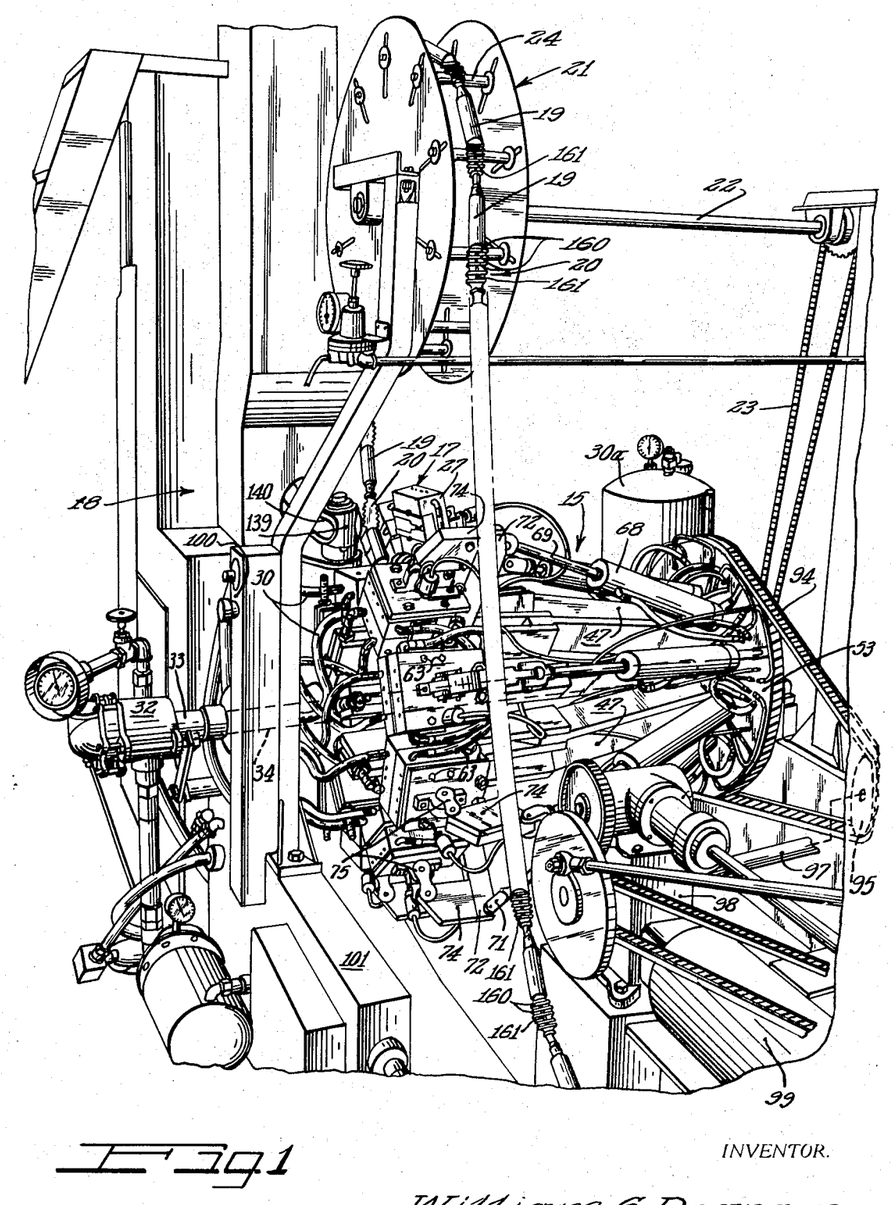
FIG. 1 is a perspective view of apparatus embodying features of the invention.

Referring to FIG. 1, molding apparatus is shown comprising a rotor 15 having means for driving it in one direction of rotation and having means for individually mounting in circumferential alignment a plurality of separable cavity mold assemblies 17 and adapted while travelling a circular path with the rotor to register seriatim with a plastics extruder 18. Motivating means are provided operable cyclically in the rotation of the rotor 15 to open each of the mold assemblies sequentially before reaching the extruder for releasing molded articles 19 from the molds, and while the molds are still open and upon reaching registration with the extruder plastic material is received from the extruder thereinto. The motivating means then acts to close the molds for molding the plastic material into the articles 19.

In order to facilitate stripping of the articles 19 from the successively opened molds, and subsequent handling of the articles to finishing apparatus, the articles are connected in an articulated chain with an integral-connecting link 20 between each article and the next adjacent article in the chain. From the molds 17, the chain of articles 19 may be trained over a takeoff wheel 21 keyed to a rotary shaft 22 driven in unison with the rotor 15 by suitable means such as a flexible drive connection 23. On the stripper wheel are transverse-propelling bars 24 spaced to receive the articles 19 therebetween at the links 20 for propelling the chain in stripping relation to the underlying mold assemblies 17.

Figure 10:
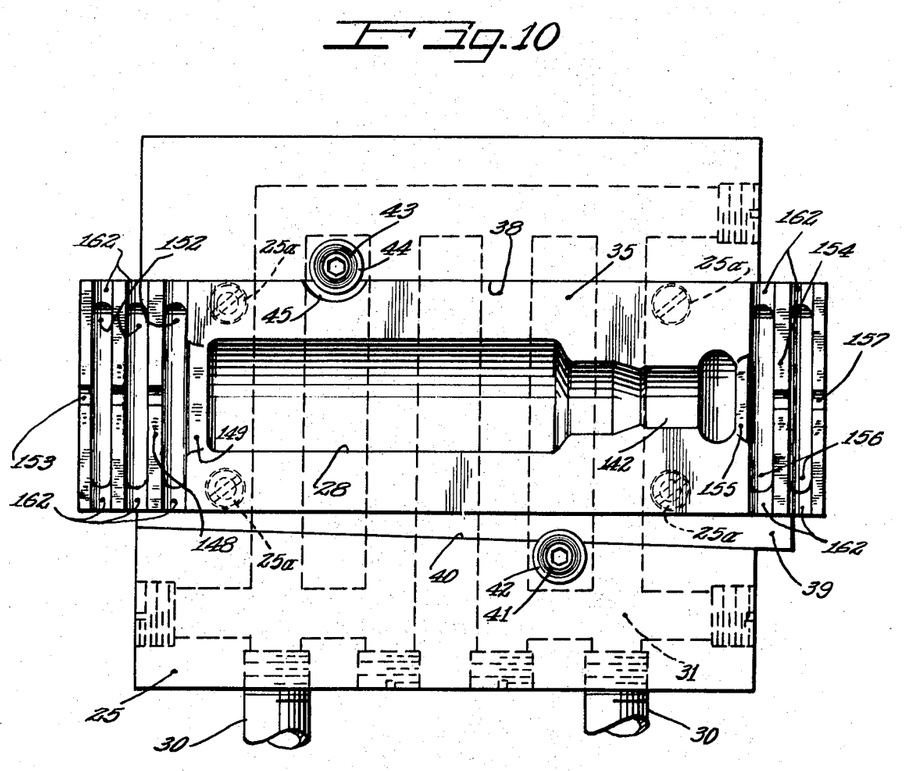
FIG. 10 is a plan view of the bottom half of a cavity mold according to the present invention.
Figure 11:
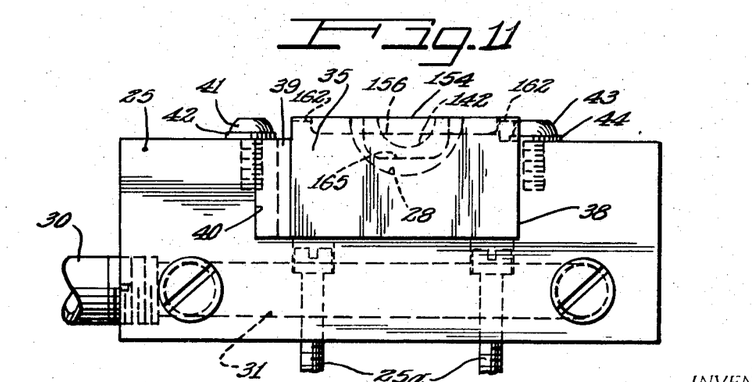
FIG. 11 is an end elevational view looking toward the left in FIG. 10.

There may be as many of the mold assemblies in cooperative circumferential alignment on the rotor 15 as may conveniently be utilized. In the arrangement shown 10 such mold assemblies have been used. Each of the mold assemblies 17 comprises complementary articulated halves 25 and 27 (FIGS. 1, 2 and 3) which are mounted to be swung open and closed. For this purpose, each of the mold halves includes a similar body block which may be made of suitable metal such as steel or aluminum. In their confronting faces, the body blocks of the mold halves 25 and 27 are provided with complementary matching molding cavities 28 and 29, respectively. Inasmuch as the plastic material may be supplied at a relatively high temperature such as up to 220°F. to facilitate molding, it is necessary for high-speed operation to provide a cooling system which will circulate a coolant such as water through the mold body blocks to chill the molded articles sufficiently to be self-sustaining upon release from the molds. For this purpose, it has been customary to provide the mold body blocks with chambers or passages for circulating the coolant. Herein coolant supply ducts 30 such as flexible hoses are suitable connected to the respective die body blocks 25 and 27, and each of the blocks is provided with a suitable pattern of coolant circulation passages 31, such passages being indicated in FIGS. 10 and 11 in the mold body blocks 25, but it will be understood that a similar arrangement is in the mold body blocks 27. Coolant circulation is effected from a suitable pressurized supply such as a tank 30a through a rotary coupling assembly 32 on a hollow front end portion 33 (FIG. 1) of a rotary shaft 34 by which the rotor 15 is mounted, and in communication with which the ducts are connected.

In order to enable quick change in the mold assemblies 17 for different articles or different sizes of articles, without necessitating detachment of the various coolant ducts or removal of the mold body blocks 25 and 27 from the machine, and which would require many hours of nonproductive downtime for the machine where all of the molds must be changed, the mold cavities 28 and 29 are provided in respective quickly replaceable inserts 35 and 37. Each of the cavity inserts 35 and 37 is constructed as an elongated transversely rectangular block having the respective mold cavity upon in one face thereof and with the cavity block seated in a respective complementary longitudinal recess 38 in the associated mold body block and separated from the coolant passages 31 to that changes can be made without draining the coolant circulation system. Installation of the cavity insert section blocks 35 and 37 is quickly effected by setting the same into its receiving recess 38 in the associated mold body block and then locking the blocks firmly together in not only the effective operating relation but also thorough heat transfer relation. Desirably this is effected by having the bottom and one side surface of the cavity insert block machined to make close face-to-face contact with the bottom and one side surface of the receiving recess 38. At the opposite side an elongated wedge 39 (FIGS. 2, 3, 10 and 11) is driven in firm retaining and heat transfer relation against and between the side of the cavity block and the adjacent side of the receiving cavity as well as against the bottom of the cavity and desirably comprises a high-heat transfer capacity material such as bronze which works very well especially where both the mold body block and the insert block are of aluminum. To enhance these features, the wedge 39 is at least as long as the associated mold body block and desirably a little longer, with the wedge-receiving side of the receiving recess tapered complementary to the wedge taper for receiving the wedge with an endwise tapped in, tight-locking engagement. For retaining the wedge against unintentional displacement, it is desirably locked in place by a retaining screw 41 and a washer 42. As further assurance against displacement of the cavity insert block 35 a retaining screw 43 and washer 44 are desirably provided fastened into the mold body block and gripping the cavity insert block in a clearance recess 45 at the side opposite to the wedge-engaged surface, with the parting face of the cavity insert block sufficiently spaced beyond the adjacent face of the mold body block to afford ample clearance for the heads of the retaining screws 41 and 43 when the confronting parting faces of the complementary cavity insert blocks 35 and 37 are brought into firm mold-closed relation. Further, it will be noted that the respective sets of retaining screws 41 and 43 associated with the insert blocks 35 and 37 are relatively offset or staggered for closed-mold clearance. Removal of the respective insert blocks 35 is readily effected by reversal of the installation steps. Through this arrangement it has been found possible to remove and reinstall a complete set of activity insert blocks in a 10-mold machine in about 1 hour.

In structure and relationship the mold cavity sections 28 and 29 and the insert blocks 35 and 37 are such that there is efficient circumferential alignment thereof in the molding phase of the machine cycle. To this end, while the mold body blocks 25 are separated at their ends as shown (FIGS. 1, 2 and 3), the respective opposite ends of the insert blocks 35 extend substantially beyond the ends of the associated mold body blocks to about the respective ends of the companion insert blocks 35 at least at their parting face edges, and desirably throughout the adjoining ends for strength and stability. For this purpose the respective opposite ends of the insert blocks 35 are appropriately complementally chamfered. This enables the supporting mold body blocks 25 to be stationarily mounted on and about the rotor 15, while the mold body blocks 27 and the cavity inserts 37 carried thereby are mounted to be swung between open and closed relation to the relatively stationary mold halves. Full-length registration of the cavity inserts 37 with the respective opposed cavity inserts 35 is effected by having the parting faces of the cavity insert blocks 37 complementary in length to make full contact with the confronting parting faces of the insert blocks 35. At their opposite ends, the insert blocks 37 may extend beyond the respective opposite ends of the supporting mold body blocks 27.

Figure 4:
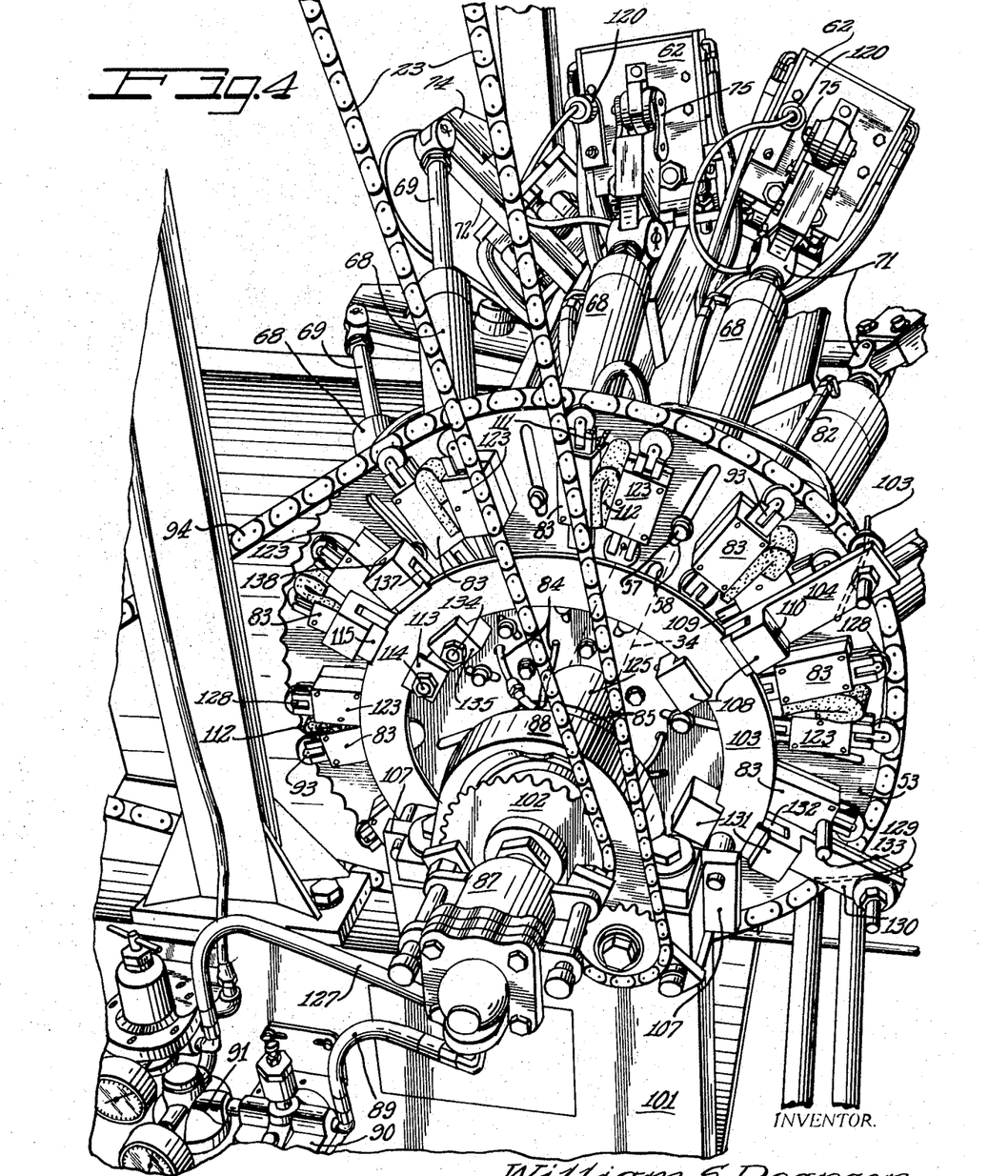
FIG. 4 is a rear perspective view of the apparatus.
Figure 6:
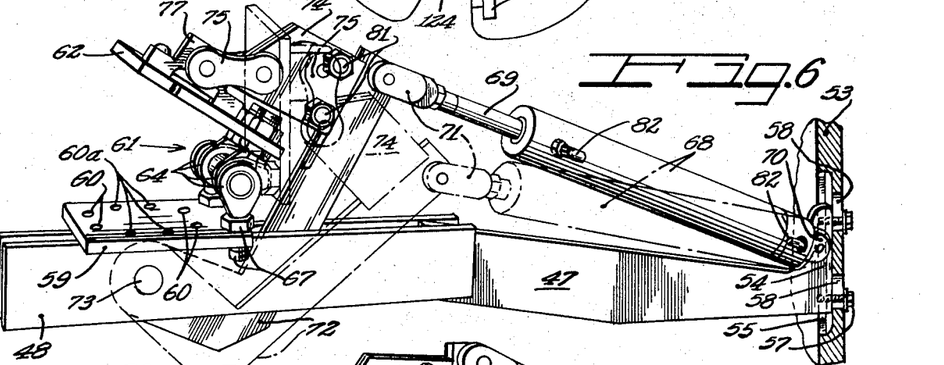
FIG. 6 is a side isometric view of one of the mold-actuating assemblies of the apparatus showing the same in various open mold positions.
Figures 7, 9:
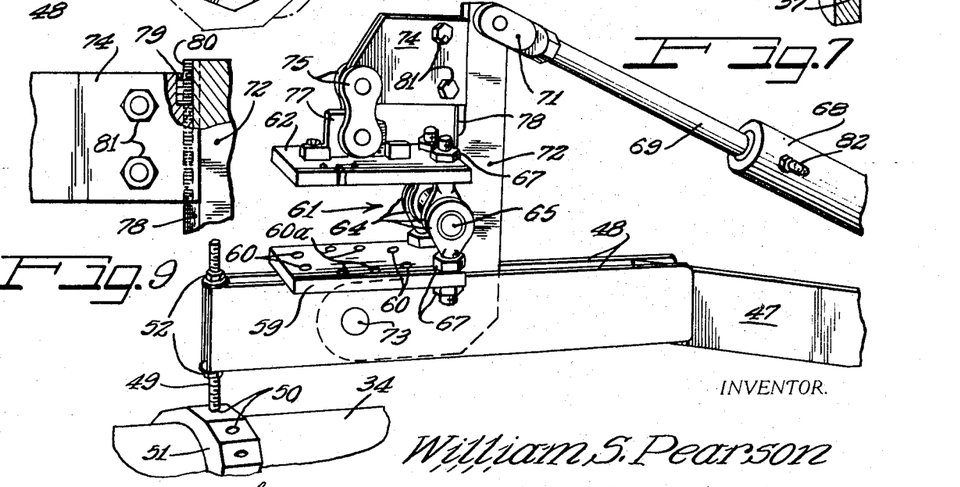
FIG. 7 is a similar side isometric view showing the mold actuating device in the closed-mold position.
FIG. 9 is a fragmentary elevational and sectional view taken substantially along the line IX—IX of FIG. 8.

To enable individual adjustment of each of the mold assemblies 17 for optimum performance, to avoid transmission of distorting stresses or strains from one assembly to the other when and if they occur, and to enable mounting of different size molds when required, construction and arrangement of the rotor 15 is such that each of the mold assemblies is individually mounted and motivated. To this end there is provided for each of the mold assemblies 17 an individual, adjustable and replaceable mounting beam 47 (FIGS. 1, 6 and 7) disposed in a respective radial plane parallel with the axis of the shaft 34 and attached at each end for adjustment in such plane relative to the shaft. In its front end portion, the beam is provided with a parallel arm, slot-providing bifurcated portion 48 which at its outer end straddles a threaded-supporting rod 49 extending radially relative to the shaft 34 and having an end anchored fixedly in a respective socket 50 in a corotative collar 51 on the shaft. Optimum substantially micrometer adjustment of the front end of the beam as well as major radial adjustments are thus enabled by suitable manipulation of adjustment nuts 52 by and between which the opposite edges of the beam section 48 are engaged. At its opposite or rear end, the beam 47 is radially adjustably attached to a combination mounting disk and rotor driving wheel 53 (FIGS. 4 and 6) which is corotatively mounted on the shaft 34. For this, the beam 47 has a radial fin terminal 54 engaged in selectively radially slidably adjustable relation in a respective radial groove 55 provided therefor in the adjacent face of the disk 53, with securing bolts 57 extending through respective vertical slots 58 aligned with the groove 55.

Attachment of the mold body blocks 25 to their respective beams 47 is by means of respective mounting baseplates 59 fixedly attached to the beam portions 48 as by means of screws 60. The blocks 25 are adapted to be secured to the baseplates 59 by means of screws 25a (FIGS. 10 and 11) engaged in screw holes 60a in the plates.

Mounting of the mold body blocks 27 on the beams may also be on and through the mounting plates 59, but in a manner to enable articulated movement of the mold bodies 27 relative to the mold bodies 25. For this purpose, an articulating hinge structure 61 is mounted on each of the plates 59 rearwardly adjacent to the mold body block 25 in each instance and hingedly supports a baseplate 62 to which the mold block 27 is suitably secured as by means of screws 63. Desirably the hinge structure 61 comprises an assembly of rod ends 64 relatively pivotally connected by a hinge pin 65 and with threaded end portions of respective pairs of the rod ends adjustably attached to the respective plates 59 and 62 as by means of respective pairs of nuts 67. Through this arrangement, highly accurate parting face closing engagement of the mold halves and more particularly the cavity insert sections is attainable.

For motivating the hinged mold halves, a combination fluid actuator and lever system is provided comprising a rectilinear cylinder 68 having a piston operated reciprocable piston rod 69, with the rear end of the cylinder pivotally secured through a clevis 70 thereon to the attachment ear 54 of the beam. At its outer end, the piston rod 69 has a clevis 71 pivotally attached to he outer end of a rocking motivating lever 72 of generally L-shape having a shorter leg thereof located within the slotted front end portion 48 of the beam and extending forwardly and attached pivotally thereto by a pin 73 subjacent the mounting plate 59. Extending forwardly from the outer end portion of the lever 72 is an arm 74 related in generally C clamp, but spaced relation to the mounting plate 62 and connected at its outer end thereto by means of a pair of parallel links 75 pivoted at one of their ends to the arm 74 and at their opposite ends to a rigid ear 77 on the mounting plate 62. Through this arrangement, actuation of the actuator 68, 69 effects rocking of the lever 72 and through the arm and link connection with the plate 62 effects substantially 90° movement of the mounting plate 62 and thereby the mold body 27 supported thereby from a closed-mold position to a fully open position, as may be visualized on comparison of the dash line position of FIG. 6 with the full line showing in FIG. 7. As will also be observed in FIG. 7, in the closed position the links 75 extend normal to the plane of the mounting plate 62 and thus normal to the plane of the associated articulated mold half, and the lever 72 has its pivot 73 aligned with the axis of the links in the closed position so that a C-clamp latching action results which positively holds the mold closed against blowing apart during molding. Since molding pressures are thus effectively resisted extremely close parting face contact of the cavity insert blocks is assured and parting joint flash is avoided on the molded articles. On the other hand, by virtue of the link connection 75, should there be an obstruction to closing of the mold, completion of mold-closing stroke of the actuator 68, 69 will be effectively resisted without damage to the mold assembly.

Figures 5, 8:
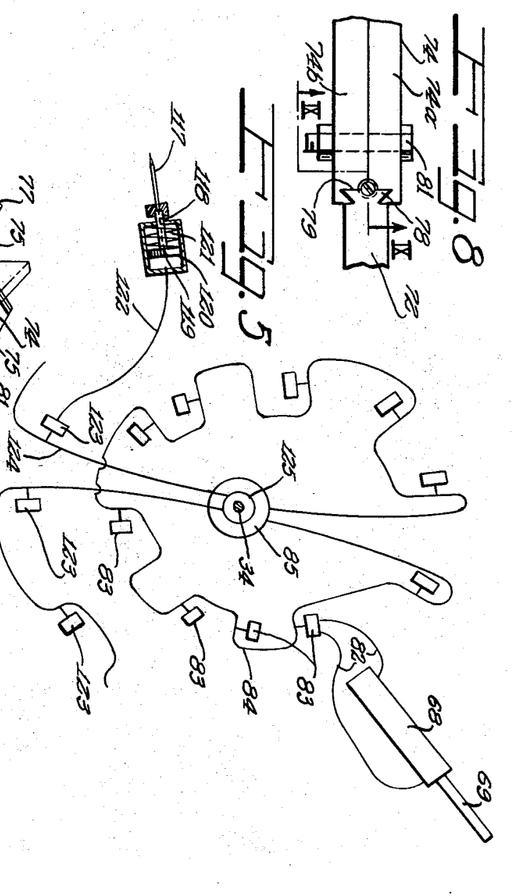
FIG. 5 is a schematic-operating circuit diagram.
FIG. 8 is a fragmentary plan view taken substantially along the line VIII—VIII of FIG. 7.

For optimum operating adjustment of the link 75 with respect to the mounting plate 62, the arm 74 is mounted to be longitudinally adjustable along the lever 72. For this purpose, the arm 74 comprises a pair of complementary plates 74a and 74b engageable with a longitudinal dovetail 78 (FIG. 8) along the edge of the lever 72. Longitudinal adjustment movement of the arm 74 along the dovetail is adapted to be effected by means of an adjustment screw 79 (FIG. 9) carried by the arm and threadedly engageably within a half-threaded groove 80 along the dovetail. Adjusted position is maintained by clamping the dovetail plates 74a and 74b as by means of bolts 81 whereby to hold the screw 79 and the dovetail firmly gripped against unintentional displacement of the arm.

By preference, pneumatic operation of the actuator 68, 69 is provided for because of the inherent yieldability of compressed air so that any obstruction between a mold half or possibly overloading of the mold will not result in damage to the mold or the motivating means. Nevertheless, under proper operating conditions, the C-clamp lever and link mechanism will effectively lock the mold against separation due to acceptable molding pressures. To this end, each of the actuator cylinders 68 has connected thereto adjacent to its opposite ends suitable air hoses 82 which are connected to a compressed air source through control mechanism functioning to operate the actuators in proper sequence to open and close the associated mold assemblies. For this purpose, the airhoses 82 for each of the actuators are connected to a respective double-acting valve 83 (FIGS. 4 and 5) which are desirably mounted on the back of the mounting disk and rotor-driving wheel 53 and to which compressed air is delivered through a common duct 84 connected to the air source through a distributor 85 carried corotatively on the shaft 34 and receiving air through a rotating joint having a housing 87 fixedly mounted at the rear side of a bearing 88 for the shaft. To the joint air is delivered by a duct 89 connected through an oil injector 90 and a pressure gauge 91 with an air tank 92 (FIG. 1) to which a suitable air compressor (not sown) is operatively connected. Each of the valves 83 is of the kind having a reciprocable movable plunger 93 having suitable rollers on its opposite ends. Movement of the plunger 93 in one direction effects mold-closing operation of the associated actuator, and movement of the plunger in the opposite direction effects mold-opening operation of the associated actuator.

Operation of the valves 83 is effected in the rotation of the wheel 53 which is driven continuously at the desired operating speed for the rotor 15 by means such as a drive chain 94 trained over the toothed perimeter of the wheel and over a driving sprocket 95 on a shaft 97 extending drivingly from a gearbox 98 and driven by a suitable electrical motor 99 which may be controlled from a control panel 100 on the front portion of a frame 101 carrying the bearings in which the rotor shaft 34 is journaled. It will be observed (FIG. 4) that the take off or stripper wheel drive chain 23 is driven in unison with the mounting disk and driving wheel 53 by a sprocket wheel 102 corotative with the rear end portion of the shaft 34.

Each of the valves 83 is mounted with its plunger 93 on an axis radial to the axis of the shaft 34 so that respective valve plunger shifting devices mounted alongside the back of the wheel 53 will operate the valves in proper timed sequence. For this purpose, a mold-closing valve actuator 103 in the form of a finger is mounted in the path of advance of the valves 83 theretoward to depress each of the valve plungers 93 as it passes the control finger. Conveniently, the control finger 103 is adjustably mounted on a radially extending arm 104 carried by a fixed supporting annulus 105 mounted through brackets 107 on the machine frame 101. In order to adjust the supporting arm 104 in a circumferential direction for proper timing of the valve operation, the arm has a mounting annulus gripping structure 108 including a tightening block 109 operated through a screw 110. By loosening the screw 110 the arm 104 can be adjusted on and about the annulus 105 to the optimum valve operating position. Air exhausting from the valves 83 is directed by means of suitable ports 111 toward the drive chain 94 to impinge lubricating oil entrained in the air onto the chain. Absorbent pads 112 are desirably mounted adjacent to the ports 111 to catch surplus oil.

For reversing each of the valves 83 sequentially to open the successive molds, a valve-actuating device 113 is mounted at the proper place on the mounting annulus 105 spaced from the mold-closing operator, and constructed and arranged for adjustment circumferentially on the annulus. A valve-actuating element 114 is carried by the device 113 along the inner perimeter of the mounting annulus 105. A tightening block 115 carried by the device 113 enables the device to be fixed in the properly adjusted position. Through this arrangement, as the respective valves 83, which are equally spaced circumferentially on the wheel 33 successively pass the respective valve shifters, the mold motivating actuators are responsively operated to respectively close the molds and to open the molds in proper sequence.

For blowing the articles 19 to size within the respective mold cavities, each of the articulates mold halves is provided with an air injecting hypodermic needle 117 (FIGS. 2, 3 and 5) mounted on a plunger 118 operated by a piston 119 mounted reciprocably within a cylinder 120 and normally retracted by a compression spring 121 but adapted to be driven in a protractional stroke by air pressure supplied to the cylinder through a duct 122 from a valve 123 connected to a supply line 124 communicating with a distributor 125 (FIGS. 4 and 5) on the shaft 34 adjacent to the distributor 85. Compressed air as free as practicable from oil or moisture is supplied to the distributor 125 through the coupling 87 which is of dual passage form for this purpose, by way of a duct 127 suitably communicating with a source of air pressure. Each of the cylinders 120 is mounted by means of a bracket 128 on the associated mounting plate 62, with the hypodermic needle 117 extending through suitable aligned bores in the mold body block 27 and the cavity block 37. In practice the needle 117 may have a stroke of about five-eighths inch between a mold cavity clearing, retracted position and an article blowing protracted position wherein the needle penetrates to he hollow interior of the article in the mold.

Sequential operation of the hypodermic needle-controlling valves 123 is effected similarly as has been explained in respect to the mold-motivating mechanism control valves 83. To this end, each of the valves 123 is mounted on the backface of the wheel 53, desirably in paired proximity to one of the valves 83 and in a relatively offset plane relationship thereto such that the valve-operating finger 103 will be cleared by respective roller-carrying reciprocable valve-controlling plungers 128 of the valves 123 in the rotation of the wheel 53, but a valve-operating arm 129 will shift the plungers 128 in proper timed relation after closing the respective mold assemblies 17 to pressurize the blowing needle cylinders 120 to project the associated needle 117 into article blowing position wherein the air pressure utilized for driving the needle is also bled through the piston 119 and the plunger 118 into and through the needle 117 into the article. Supporting the valve-actuating finger 129 is a radial-mounting arm 130 mounted for circumferential adjustment on the supporting annulus 105 and having a mounting yoke 131 provided with a tightening block 132. In order to disable the valve-operating finger 129 quickly for emergency purposes or when it is desired to effect adjustments, or when for any other reason it is desired to maintain any of the successive hypodermic needle units inactive, or even the entire system inactive in any one or more machine cycles, a handled lever 133 is provided on the mounting structure for the finger 129 so that the finger can be quickly swung out of valve operating position to an inactive position, but can be just as quickly returned to the active position by swinging the lever 133 back to the operating position.

After article blowing has been completed and a sufficient molding cycle time interval has elapsed, the valves 123 are reversed to shutoff the air pressure and to exhaust air from the needle cylinders 120 so that the biasing spring 121 will retract the respective needles. For this purpose, a valve-operating device 134 is provided carried by a yoke 135 mounted for circumferential adjustment on the carrying annulus 105 and retained in adjusted position by a tightening block 137 secured by a setscrew 138. As the respective valves 123 pass the valve-operator 134, the plungers 128 are returned to the air shutoff and needle cylinder exhausting condition of the affected valve 123.

Figure 2:
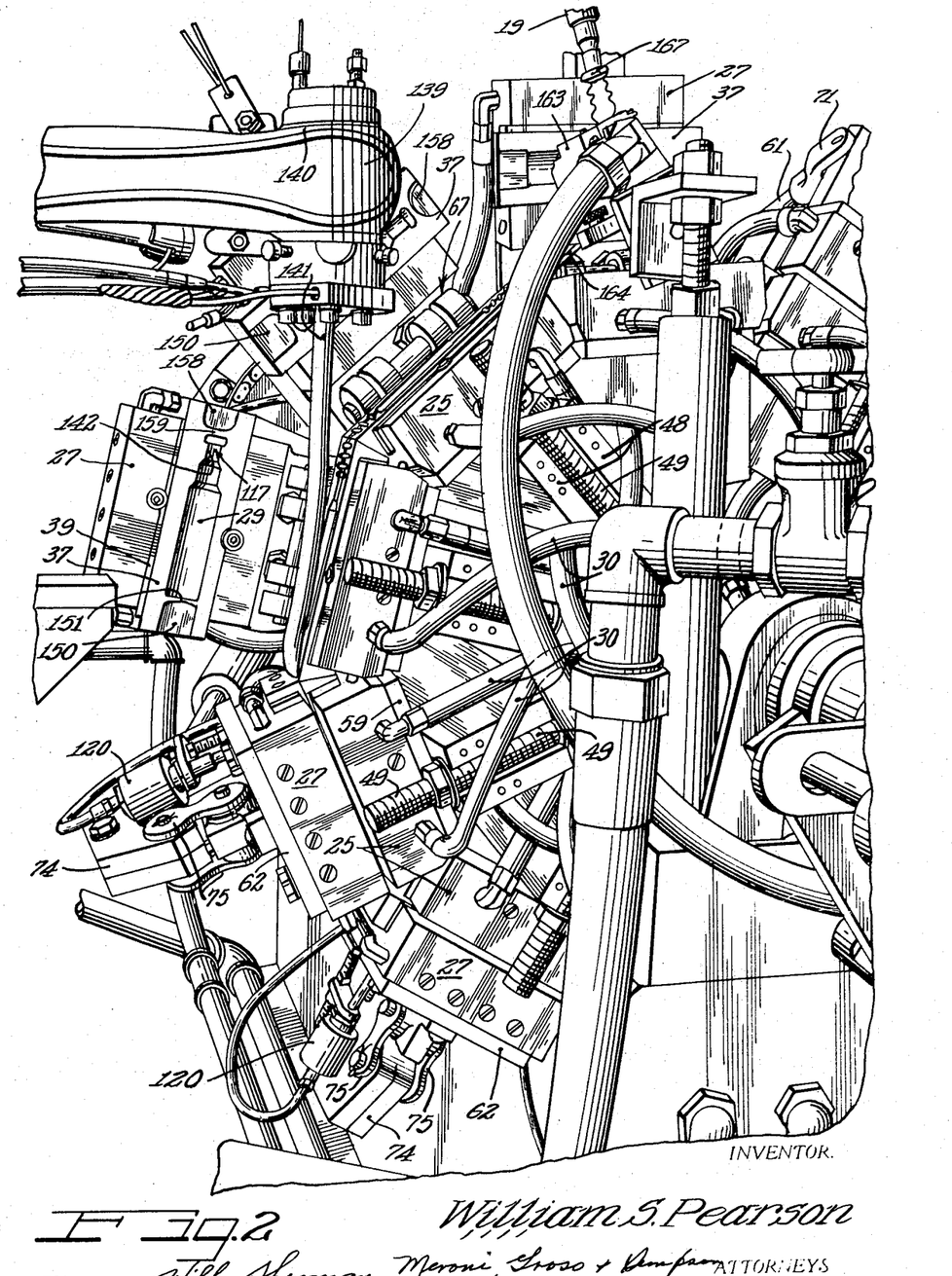
FIG. 2 is an enlarged fragmentary perspective view of the apparatus disclosing the cooperative relationship thereof to and with a plastics extruder.
Figure 3:
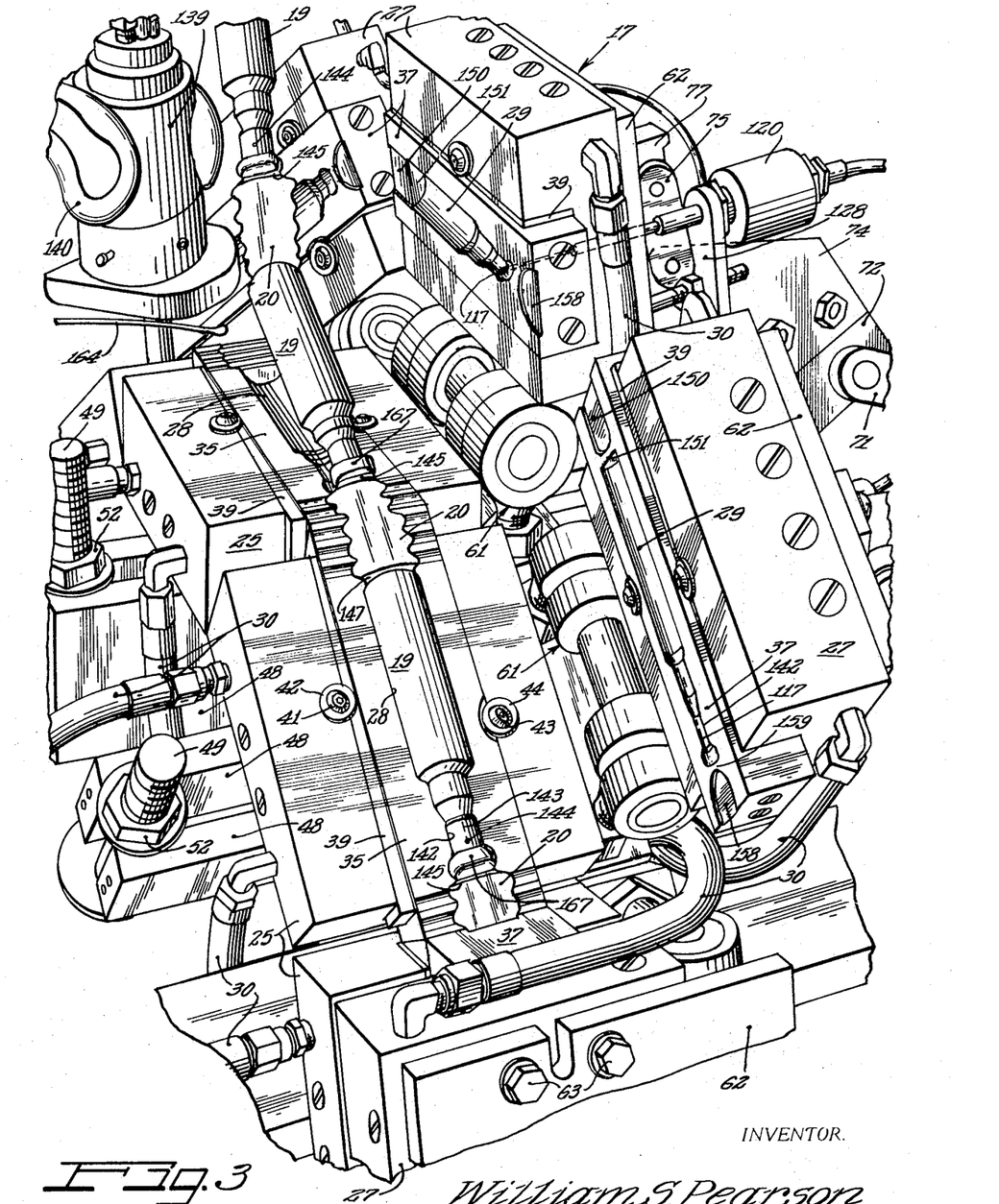
FIG. 3 is a fragmentary enlarged perspective view of the apparatus showing in greater detail how molded plastic articles are stripped from the separable molds.

In operation, the molding machine rotor 15 is so located with respect to the extruder 18 that plastic material to be molded is received by the respective open mold assembles 17 from a downwardly delivering extruder head 139 FIG. 2). This head is provided with suitable heating means 140 such that a continuous tubular thermoplastic parison 141 will descend at the proper temperature and rate of gravity elongation as extruded from the head. Extrusion rate may be at relatively high speed by virtue of the close location of the parison-receiving mold assemblies 17 to the point of extrusion, as enabled by the full 90° opening of the molds by virtue of the novel motivating means already described. Thereby, the open halves 27, 37 of the molds are adapted to pass closely alongside the extruder head 139 (FIG. 3) and the successive molds to receive the parison 141 move into position closely under the extruder head 139 and upon reaching a vertical position the open half of the mold is free to swing closed onto the parison to engage the same within the closed cavity 28, 29 and whereupon the hypodermic needle 117 associated with the mold is activated to blow the parison from the initial smaller diameter to a larger blown diameter with the mold cavity.

In the illustrated instance, the molded articles 19 are disclosed as bottle blanks. For this purpose, the cavity sections 28 and 29 have respective matching bottle body portions of maximum diameter and bottleneck forming portions of smaller diameter at one end of the bottle body cavity portion. Each of the cavity sections also has a matching extension 142 (FIG. 2, 3 and 10) which provides on the bottle blank neck portion a blowing head extension 143 receptive of the blowing air hypodermic needle 117 in each instance, which after molding has been completed leaves a characteristic entry hole 144 in the head 143. This portion of the blank is adapted to be subsequently trimmed off in bottle-finishing apparatus.

Formation of the connecting links 20 of the molded article string is effected in a manner to afford several advantages. At one end, the link 20 is connected to the head end of the associated pair of bottle blanks by a thin hinge web 145 and at its opposite end the web is connected to the base end of the other bottle of the connected pair by a thin hinge web 147. These hinge webs enable relatively free hinging of the respective blanks about the hinge axes at each end of the link to facilitate stripping of the blanks from the molds and running of the chain or string of blanks over the stripper and takeoff wheel 21, as well as subsequent handling of the string. Between the hinge webs 145 and 147, the respective connecting links 20 are desirably relatively rigid but with a practical minimum of material whereby to maintain the amount of scrap at a low level, and to enable complete curing of the links in the curing time interval for the article blanks. Further, in the formation of the links 20, means are provided to enable gauging by visual inspection as to whether the proper amount of plastic materials has been supplied per article unit by the extruder, namely, to check whether the extruder is in proper parison rate synchronism with the molding apparatus. To this end, the cavity section blocks 35 and 37 have connecting tab or link-forming arrangements comprising at one end of the mold cavity section block 35 a link molding portion 148 having at juncture with the cavity section 28 a hinge web-forming surface area 149 tapering therefrom. The remainder of the molding portion 148 from the area 149 to the adjacent end of the parting face cooperates with a shallow matching link tab thickness governing cavity recess 150 (FIGS. 2 and 3) in the confronting end portion of the parting face of the associated cavity section block 37 and which is defined at the adjacent end of the main article-molding cavity section 29 by a hinge web-forming area 151 which coacts with the area 149. To minimize the amount of material in the link 20 and yet provide a sufficiently rigid link structure for the intended purpose, the molding portion 148 is provided longitudinally therealong with spaced parallel transversely extending grooves 152 which are desirably of sufficient length to permit unhampered outward movement of plastic therein, and which are connected by a center longitudinal, but desirably shallower, groove 153 running out at the end of the parting face.

At the opposite end portion of the cavity block 35, a similar connecting link-molding extension 154 is provided with a hinge web-forming area 155 at juncture with the head end portion 142 of the molding cavity. This portion 154 is provided longitudinally therealong with rib-forming transverse spaced parallel grooves 156 and a connecting longitudinal shallower groove 157 for the same purposes as the similar grooves in the link-molding portion 148 and, in effect, providing an extension from the portion 148 on the parting face of the cavity block 35 of the next adjacent mold assembly. In the matching parting face of the cavity block 37, a shallow link thickness governing connecting link-forming cavity recess 158 cooperates with the portion 154, and a hinge web-shaping area 159 cooperates with the area 155.

By virtue of the grooves arrangement of the link-molding portions 148 and 154, each of the links is formed with corresponding transverse ribs 160 and a connecting longitudinal rib 161. By observing the length of the respective ribs 160, visual indication of the amount of material in the parison 141 can be readily gauged. If the rate of plastic material delivery is too slow, the link ribs will show underdevelopment, whereas if the rate of delivery is too fast, the link ribs will show over development. Suitable adjustment of the extruder speed can then readily be made to cure the out-of-balance in plastic delivery without shutting down the machine. Any of the articles in the string which may have unacceptable wall structure due to any extruder maladjustment may be diverted to scrap until the proper amount of material is provided in the parison as revealed by observing development of the ribs 160, namely, whether not too long or too short. The multirib structure of the otherwise relatively thin section of the tab links 20 facilitates regrinding when they become scrap.

In addition, by having the material of the tab links 20 engaged within the forming grooves 152, 153, 156, 157 increased cooling contact with the mold section insert blocks 35 and 37 is attained so that thorough hardening occurs before the mold is opened, avoiding any wet tab condition in the connected article string.

To assure uninterrupted development of the ribs 160, relatively shallow air bleed grooves 162 are provided as extension from the grooves 152 and 156 to the respective opposite edges of the parting face of the cavity block 35. In addition the bleedoff or vent grooves 162 assure that where excessive material is supplied at the link forming portions of the molds, no excessive back pressure will develop which would inhibit proper closing of the molds.

In order to shut down the machine and the extruder automatically in the event of a failure to properly strip the molded articles from the open molds, a safety switch device 163 (FIG. 2) is provided having a trip arm 164 disposed to project over the mold cavities 28 in a position immediately after the molded article has been stripped therefrom. Should the article 19 not be stripped from the mold or if there is an undue lag in stripping, the actuator finger 164 will be engaged and trip the switch to shut down the machine and the extruder.

It may also be noted that the molding cavities are provided at the outer ends of the extensions 142 with generally rectangular respective enlargements 165 (FIGS. 2, 3, 10 and 11) which provide corresponding heads 167 on the molded article blanks. These heads 167 are useful in providing handling shoulder and orientation or indexing means in the postmolding processing of the blanks.

In order to avoid the air entrapment in the coolant circulation passages 31 in the mold blocks 25 and 27 when the machine is shut down, the ducts 30 are so connected to the hollow distributor 33 that the ducts leading to the mold assemblies 17 which are at any time at the top of the circuit have their connections into the lower portion of the distributor 33. As a result, any air present in the distributor 33 during shut down will be prevented from rising into the uppermost mold assemblies where it might remain trapped and impair efficiency but will remain trapped in the distributor and will then be readily purged from the system when the machine is again operated and circulation resumed.

I claim as my invention:

1. In apparatus for molding hollow plastic articles such as bottles and including a rotor mounted on a horizontal axis and having means which drive it in one direction of rotation, said rotor comprising:

a plurality of separable mold assemblies each of which has complementary cavitated mold halves articulated for opening and closing the assembly;

respective generally horizontal beams individually mounting said assemblies in circumferential alignment about the rotor axis and adapted in rotation of the rotor to register seriatim with a plastics extruder; and motivating means on said beam operable cyclically in the operation of the rotor for opening said mold assemblies sequentially before reaching the extruder to release molded articles and while still open and upon reaching registration with the extruder to receive plastic material therefrom, the motivating means then acting to close the mold assemblies for molding the thus received plastic material.

2. Apparatus according to claim 1, including means adjustably connecting each of said beams individually in the rotor for adjustment radially relative to the rotor axis, said beam and the mold assemblies as well as said motivating means being thereby adjustable in unison relative to said axis by a simple adjustment of the respective beams.

3. Apparatus according to claim 1, said rotor having a shaft, means journaling the shaft, and means attaching opposite end portions of said beams to the shaft.

4. Apparatus according to claim 3, said attaching means comprising structure enabling adjustment of the position of each beam independently radially relative to the shaft.

5. Apparatus according to claim 4, said structure comprising a respective radially extending adjustment screw for determining the radial disposition of one end portion of each beam relative to the shaft, and the opposite end of the shaft having mounted thereon a coaxial fixed annular structure to which the attaching means structures at the opposite end portions of the beams are secured in radially adjustable relation.

6. Apparatus according to claim 1, said motivating means comprising respective generally C-shaped lever structure pivotally mounted on each beam operatively connected to the respective mold assembly and rockable between a mold assembly closing position and a mold assembly opening position.

7. Apparatus according to claim 6, including a respective link connecting each lever structure with its associated mold assembly.

8. Apparatus according to claim 7, the link coacting with the lever structure and the mold assembly as a positive holding latch to prevent blowing open of the mold assembly during molding.

9. Apparatus according to claim 8, including a respective fluid-operated actuator connected at one end to the lever structure and at the opposite end to the respective beam.

10. Apparatus according to claim 8, comprising means effecting connecting of said link to and between said lever structure and said mold assembly preventing movement of the link into latching relation to the associated mold assembly, as a safety feature, if there is an obstruction to proper closing of the mold assembly.

11. Apparatus according to claim 8, said lever structure including relatively adjustably connected parts to one of which said link is connected.

12. Apparatus according to claim 1, each of said mold assemblies having complementary cavitated mold halves, hinge means connecting said mold halves, and means for adjusting said hinge means to enable optimum closing relation of said halves.

13. Apparatus according to claim 1, each of said mold assemblies respectively comprising separable mold halves, means securing one of said mold halves in stationary relation to the associated beam, means pivotally mounting the other of said mold halves on and relative to said beam and relative to the stationarily mounted mold half, the beam having a slot therein underlying said stationarily mounted mold half, said lever structure having an end portion thereof in said slot and pivotally connected to the beam subjacent the stationarily mounted mold half, said lever structure having a further end portion thereof superjacent the pivotally mounted mold half, and means connecting the superjacent end portion of the lever structure with said pivotally mounted mold half to effect substantially 90° pivotal movement of said pivotally mounted mold half between fully closed and fully open positions.

14. Apparatus according to claim 13, said means connecting the superjacent end portion of the lever structure to the pivotally mounted mold half comprising a link operative in the fully closed position of the mold assembly to lock the same against opening.

15. Apparatus according to claim 13, including a fluid-operated actuator connected at one end to said lever structure adjacent to said superjacent end portion and connected at its opposite end to said beam.

16. Apparatus according to claim 13, said superjacent end portion comprising an arm, and means adjustably securing said arm to the remainder of the lever structure.

17. Apparatus according to claim 16, said means connecting the superjacent end portion with said pivotally mounted mold half comprising a link pivotally connected to said mold half and to said arm.

18. Apparatus according to claim 1, wherein said mold assemblies each comprise separable mold body blocks, means providing fluid circulating system in each of said blocks, respective matching mold cavity block sections having respective parting faces which are adapted to be abutted to provide a mold cavity one portion of which is in one of said sections and the remaining portion of which is in the other of said sections, and means separately securing said cavity sections respectively to the mold blocks separated from said circulation means to enable replacement of said sections without interfering with said circulation means and without requiring removal of the body blocks from said beams.

19. Apparatus according to claim 18, each of said mold body blocks having a cavity section-receiving recess therein into which the respective cavity section is engaged, and respective wedge means locking said sections as inserts in said recesses.

20. Apparatus according to claim 19, said cavity sections having their parting faces projecting in offset relation to parting faces of said body blocks, said wedges being in said recesses and engaging between opposed surfaces of said sections and said body blocks, and additional locking means on said body blocks engaging said wedges and said cavity sections and leaving said parting faces of said sections free to engage in close abutment in the closed position of the mold assembly.

21. Apparatus according to claim 1, said mold assemblies each comprising separable mold halves each of which has one portion of a mold cavity and which portions match in a closed position of the mold halves, said mold halves having portions thereof extending beyond opposite ends of said molding cavity portions and provided with respective shallow-connecting link-molding extensions from said cavity potions and opening from the respective opposite ends of confronting parting faces of said mold half end portions to join with companion mold assemblies joined end-to-end for molding a continuous string of plastic articles connected together by intervening connecting links, said shallow-link molding extensions having at juncture with the molding cavity portions confronting shaping areas operative to mold thin flexible connecting hinge webs joining the molded articles with the connecting links.

22. Apparatus according to claim 21, said shallow-connecting link molding cavity portions including spaced transverse grooves to shape transverse ribs in said connecting links.

23. Apparatus according to claim 22, said mold halves having vent grooves therein shallower than said rib grooves and connecting the rib grooves with edges of said parting faces.

24. Apparatus according to claim 1, said mold halves having coolant passages therein, respective coolant supply ducts having connections with said passages, said rotor having a shaft including a coolant supply distributor, and connections securing the ducts in communication with said distributor in such relation as to be on the low side of the distributor when the mold assemblies are high on the rotor.

25. Apparatus for molding hollow plastic articles such as bottles comprising:
- a rotor having means which drive it in one direction or rotation;
- a plurality of separable mold assemblies each of which has complementary cavitated mold halves articulated for opening and closing the assembly;
- means individually mounting said assemblies in circumferential alignment on said rotor and adapted while travelling a circular path therewith to register seriatim with a plastics extruder;
- motivating means operable cyclically in the rotation of the rotor for opening said mold assemblies sequentially before reaching said extruder to release molded articles and while still open and upon reaching registration with the extruder to receive plastic material therefrom, the motivating means then acting to close the mold assemblies for molding the thus received plastic material;
- said motivating means comprising individual fluid-operated actuators for said mold assemblies;
- means for supplying said actuators with operating pressure fluid; individual valves for controlling the supply of pressure fluid to said actuators;
- a valve mount carried corotatively by said rotor;
- a stationary member located adjacent to said mount;
- valve operators carried by said stationary member for operating said valves in cyclical sequence;
- each of said valves comprising a reciprocable plunger;
- said stationary member comprising an annulus coaxially disposed about the axis of said rotor;
- said valve operators comprising radial arms circumferentially adjustably mounted on said annulus and each having a valve actuating device thereon;
- one of said arms having the valve actuating device thereon disposed to be operable to move the valve plungers in one direction and another of said arms having the valve actuating device operable to shift the valve plungers in the opposite direction.

26. Apparatus for molding hollow plastic articles such as bottles comprising:
- a rotor having means which drive it in one direction of rotation;
- a plurality of separable mold assemblies each of which has complementary cavitated mold halves articulated for opening and closing the assembly;
- means individually mounting said assemblies in circumferential alignment on said rotor and adapted while travelling a circular path therewith to register seriatim with a plastics extruder;
- motivating means operably cyclically in the rotation of the rotor for opening said mold assemblies sequentially before reaching said extruder to release molded articles and while still open and upon reaching registration with the extruder to receive plastic material therefrom, the motivating means then acting to close the mold assemblies for molding the thus received plastic material;
- each of said mold assemblies having a hollow plastic article blowing device;
- means for supplying the blowing devices with compressed air;
- individual valves for controlling operation of said blowing devices;
- a mount corotatable with said rotor and carrying said valves;
- a stationary member adjacent to said mount;
- valve operating assemblies carried by said stationary member for operating said valves sequentially in timed relation with said motivating means;
- each of said valves comprising a reciprocable plunger;
- said stationary member comprising an annulus coaxially disposed about the axis of said rotor;
- said valve operators comprising radial arms circumferentially adjustably mounted on said annulus and each having a valve actuating device thereon;
- one of said arms having the valve actuating device thereon disposed to be operable to move the valve plungers in one direction and another of said arms having the valve actuating device operable to shift the valve plungers in the opposite direction.

27. In apparatus for molding hollow plastic articles such as bottles and including a rotor mounted on a horizontal axis and having means which drive it in one direction of rotation, said rotor comprising:
- a plurality of separable mold assemblies each of which has complementary cavitated mold halves articulated for opening and closing the assembly;
- respective generally horizontal beams individually mounting said assemblies in circumferential alignment about the rotor axis and adapted in rotation of the rotor to register seriatim with a plastics extruder;
- motivating means on said beams operable cyclically in the operation of the rotor for opening said mold assemblies sequentially before reaching the extruder to release molded articles and while still open and upon reaching registration with the extruder to receive plastic material therefrom, the motivating means then acting to close the mold assemblies for molding the thus received plastic material;
- each of said mold halves comprising a mold body block, means fixedly securing one of said body blocks to the associated beam;
- means pivotally connecting the other of the body blocks to the fixedly secured body block;
- means for circulating coolant fluid through each of said body blocks;
- each of said blocks having a recess therein separated from the coolant supply means;
- respective mold cavity insert blocks received in said recesses; and
- means securing said insert blocks replaceably in said recesses enabling removal and replacement of the insert without disturbing said fluid circulating means and without requiring removal of said mold body blocks from said beam.

28. Apparatus according to claim 27, said recesses opening through opposite ends of said body block and said cavity inserts having end portions with project from the recesses beyond the ends of the respective body blocks.

29. Apparatus according to claim 27, said recesses opening through at least one end of the respective body block, said means securing said insert blocks replaceably in the recesses comprising respective wedges having end portions extending beyond the ends of said recesses to facilitate driving the same into right relation to the insert block.

30. Apparatus according to claim 29, including means locking said wedges against unintentional displacement.

* * * * *